United States Patent [19]
Freeman et al.

[11] Patent Number: 5,195,156
[45] Date of Patent: Mar. 16, 1993

[54] OPTICAL FIBER CONNECTOR ASSEMBLY

[75] Inventors: William R. Freeman, Richmond; Phillip Steward, Saratoga; Robert Naidoff, Portola Valley, all of Calif.

[73] Assignee: Raylan Corporation, Menlo Park, Calif.

[21] Appl. No.: 783,262

[22] Filed: Oct. 28, 1991

[51] Int. Cl.⁵ .............................................. G02B 6/42
[52] U.S. Cl. ....................................... 385/92; 385/88; 385/90
[58] Field of Search ..................... 385/92, 88, 89, 90, 385/91, 93, 94

[56] References Cited

U.S. PATENT DOCUMENTS

| | | | |
|---|---|---|---|
| 3,803,409 | 4/1974 | Prochazka | 385/92 X |
| 4,273,413 | 6/1981 | Bendiksen et al. | 385/88 |
| 4,461,538 | 7/1984 | Breed et al. | 385/88 |
| 4,547,039 | 10/1985 | Carn et al. | 385/92 X |
| 4,836,635 | 6/1989 | De Amorim | 385/88 X |
| 5,011,246 | 4/1991 | Corradetti et al. | 385/92 |

Primary Examiner—John D. Lee
Assistant Examiner—Phan Thi Heartney
Attorney, Agent, or Firm—Burns, Doane, Swecker & Mathis

[57] ABSTRACT

An optical fiber connector assembly having a housing with front and rear barrels is readily securable to a printed circuit board. A laser device is positioned in the rear barrel portion and an optical fiber ferrule device is insertable into the front barrel portion for receiving laser light. An insert member means for positioning the ferrule means in proximity to the laser means is disposed in the rear barrel portion forward of the laser means.

14 Claims, 3 Drawing Sheets

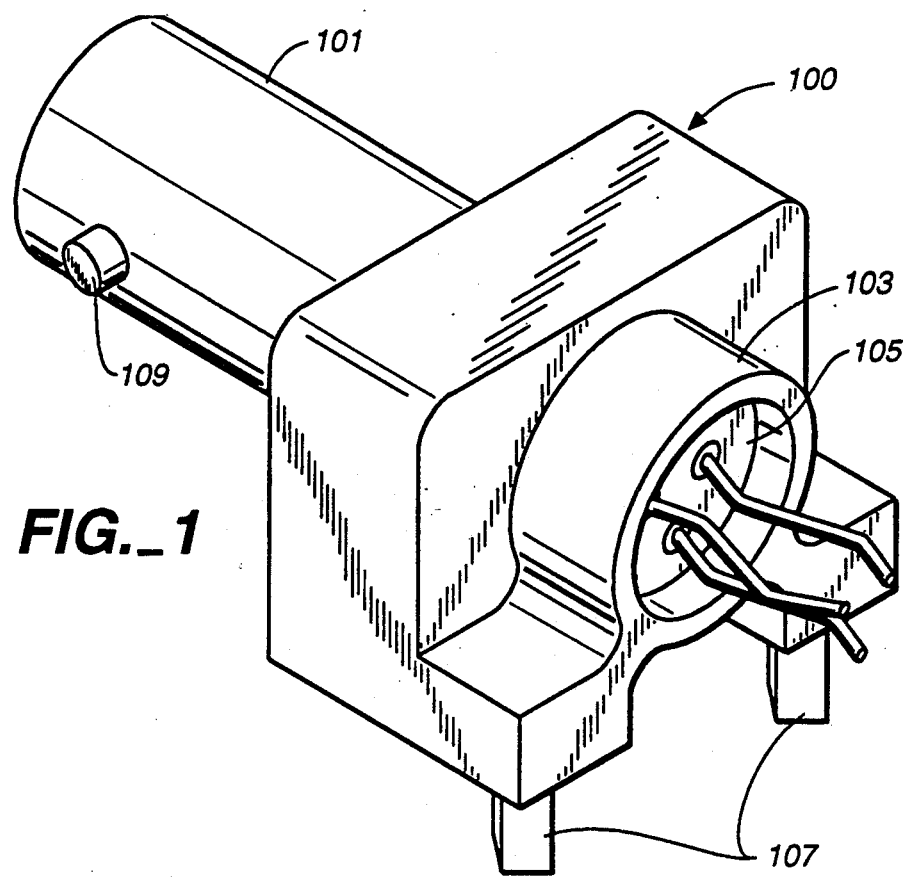
FIG._1
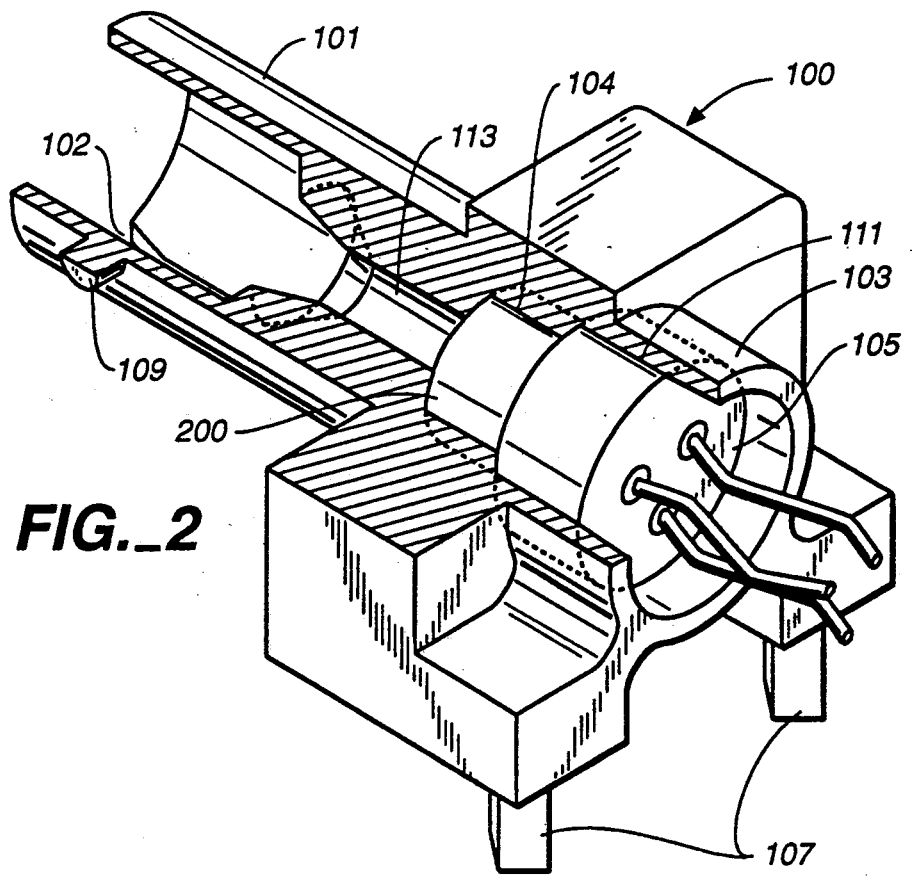
FIG._2

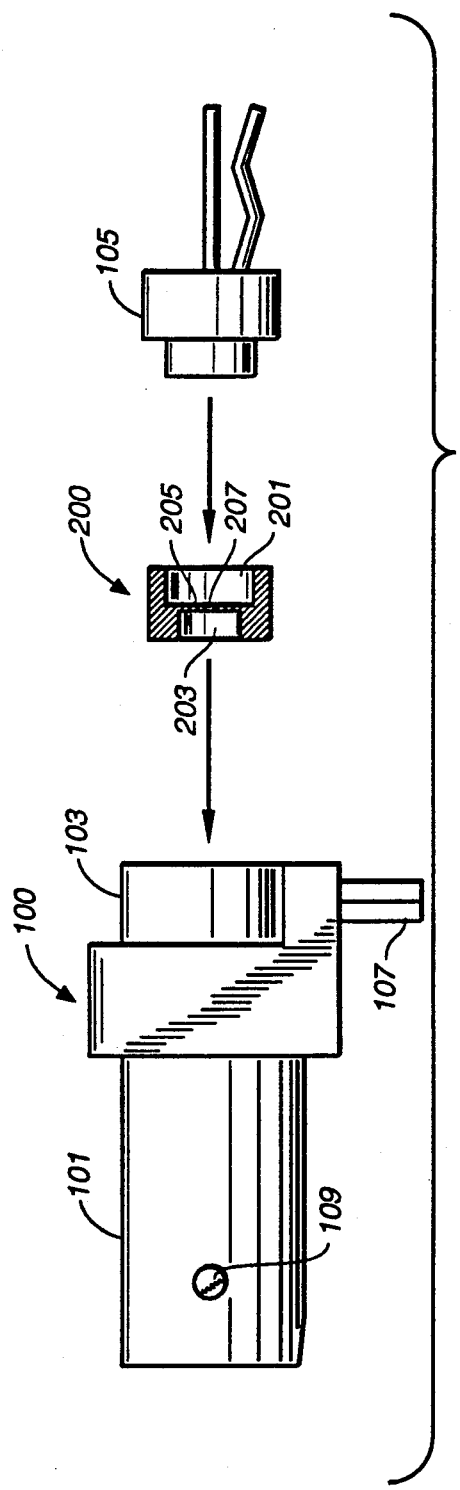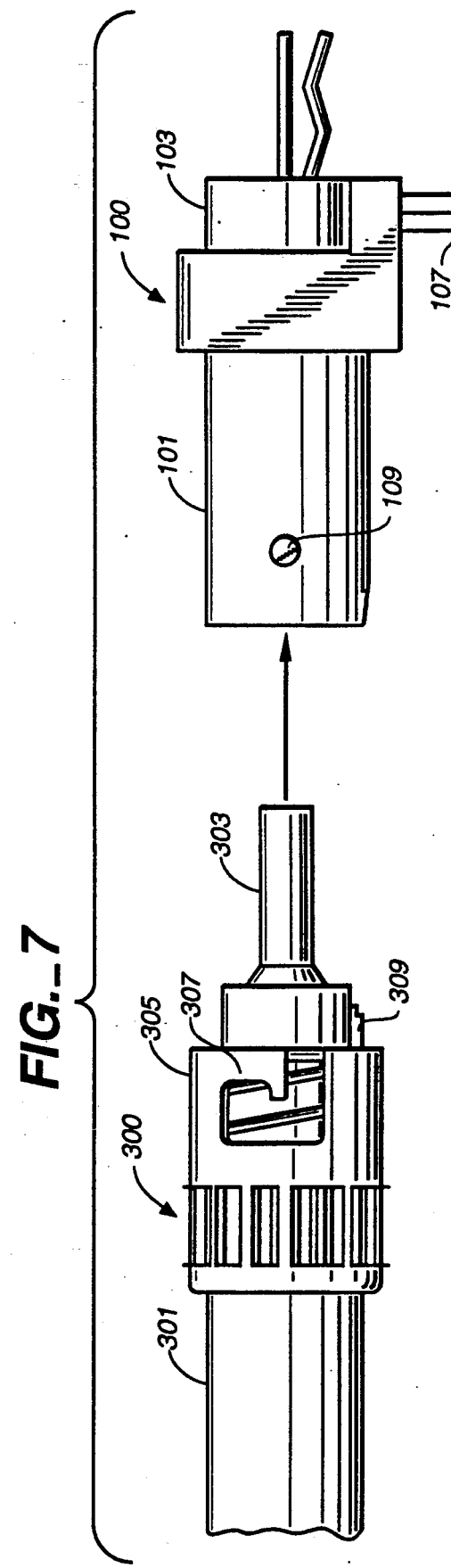

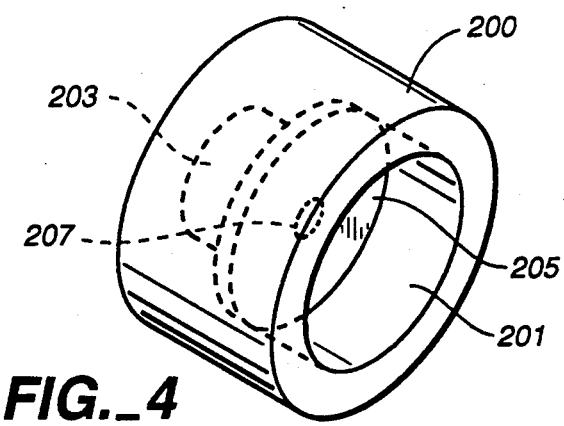
FIG._4
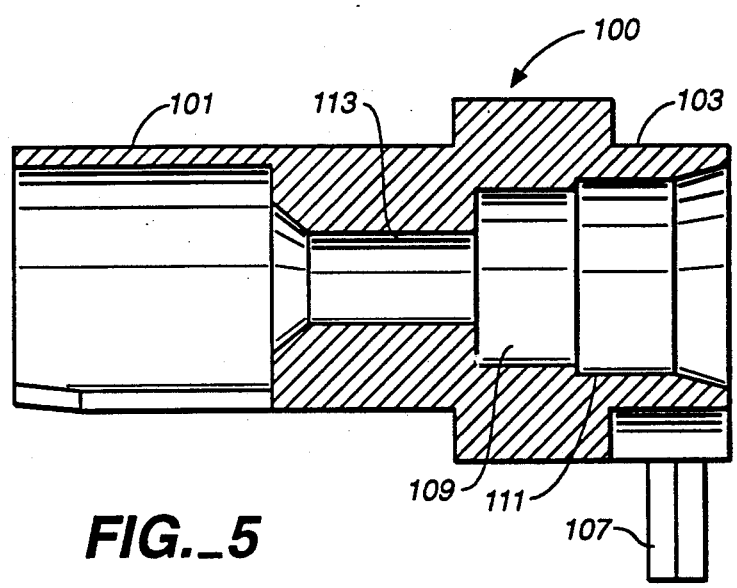
FIG._5
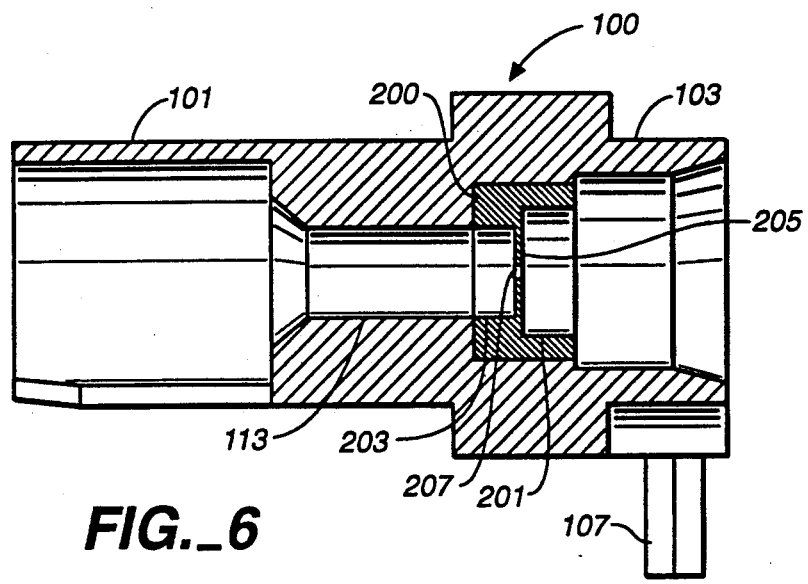
FIG._6

OPTICAL FIBER CONNECTOR ASSEMBLY

BACKGROUND OF THE INVENTION

1. Field of the Invention

The present invention generally relates to connecting devices for optical fibers and, more particularly, to connecting devices for optical fibers that are used for transmitting laser light.

2. State of the Art

Various devices have been proposed for connecting between an optical fiber to a laser light source (emitter). One device, a so-called ST connector, includes an optical fiber to whose end is spliced a fiber optic ferrule. The ferrule is mounted in a housing that contains the emitter with the emitter being mounted for directing light into the ferrule for transmission.

With ST-type connectors, the power of the laser signal introduced into the ferrule depends upon the alignment and spacing of the ferrule within the housing relative to the emitter. In practice, a ferrule can be located at different positions relative to an emitter, depending upon how the ferrule is inserted into a housing. To compensate for power variances due to variations in ferrule positioning, electronic trim pots and trim caps are required.

In multi-fiber set-ups according to the prior art, a large number of variances can arise from the various alignment and spacing variations. That is, the ferrule of any one fiber in a multi-fiber set-up can be secured in a different alignment and spacing configuration than another ferrule in the set-up. Moreover, according to the prior art, o each fiber must be individually adjusted to assure that the optically transmitted signals are consistent throughout an entire system.

In order to adequately transmit laser light without using compensating devices such as trim pots and trim caps, an emitter must be both precisely aligned with, and spaced from, the optical fiber to which it is coupled. Moreover, in systems that employ a plurality of optical fibers, the alignment and spacing should be consistent from fiber to fiber so that system-wide consistency can be o obtained. Finally, to transmit light safely, it is desirable to limit the amount of light that can escape from an emitter housing. (Stated conversely, it is desirable to maximize the amount of light that is directed at the core of a fiber.)

SUMMARY OF THE INVENTION

Generally speaking, the present invention provides an optical fiber connector assembly that accurately and consistently positions the light receiving end of an optical fiber in a suitable manner for receiving light from a laser light source while ensuring the safety of a user.

In the preferred embodiment, an optical fiber connector assembly according to the present invention includes a housing with front and rear barrel portions. In the rear barrel portion, a laser means is disposed for directing light towards the front barrel portion. In the front barrel portion of the housing, an Optical fiber ferrule means is inserted for receiving laser light. An insert member means for positioning the ferrule means in proximity to the laser means is disposed in the rear barrel portion forward of the laser means toward the front barrel portion.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a perspective view of an optical fiber connector assembly in accordance with the present invention;

FIG. 2 is a partial cross-sectional perspective view of the optical fiber connector assembly of FIG. 1;

FIG. 3 is an assembly side view of an optical fiber connector assembly of FIG. 1;

FIG. 4 is a perspective view of a membrane member of an optical fiber connector of FIG. 1;

FIG. 5 is a cross-sectional side view of a housing member of an optical fiber connector assembly of FIG. 1;

FIG. 6 is a cross-sectional side view of an optical fiber connector assembly of FIG. 1; and FIG. 7 is a side view of an optical fiber connector assembly in accordance with the present invention shown in association with a ferrule of an optical fiber.

DESCRIPTION OF THE PREFERRED EMBODIMENT

In FIGS. 1 and 2, an optical fiber connector assembly includes a housing 100 that has a front barrel portion 101 and a rear barrel portion 103. The housing 100 is securable to a printed circuit board by pins 107. The pins extend from a flange disposed towards the rear barrel portion 103. In practice, the pins secure the housing to a printed circuit board in position for wave soldering.

As shown in FIGS. 2, 5 and 6, the rear barrel portion 103 includes a bore 111 and a counterbore 104. The front barrel portion 101 of the housing 100 includes a counterbore 113 which is disposed adjacent to the counterbore 104 in the rear barrel portion 103. The counterbore 104 of the rear barrel portion 103 is sized to receive an insert member 205 (FIGS. 3, 4 and 6) and the bore 111 of the rear barrel portion 103 is sized to receive an emitter 105. In practice, the emitter can be a laser, LED, ELED, or any other device which emits light in response to an electrical signal. In practice, to eliminate the need for sealing and adhesive agents to secure the emitter 105 within the bore 111, the bore 111 is slightly undersized so as to receive the emitter 105 via a press fit connection.

As shown in FIGS. 2 and 3, the counterbore 113 of the front barrel portion 101 receives a ferrule 303 that is spliced onto one end of an optical fiber 301. As shown in FIG. 7, the ferrule 303 is secured in the counterbore 113 by a spring-loaded sleeve member 305 that includes a locking slot 307 that engages a pin 109 disposed on the outer periphery of the forward barrel portion 101. The ferrule 303 includes an alignment tongue 309 for guiding the ferrule 303 into the counterbore 113. As shown in FIG. 2, the forward barrel portion 101 includes a guide slot 102 that extends parallel to a longitudinal axis of the housing 100. Thus, with the ferrule disposed in the counterbore 113, the ferrule 303 is accurately positioned for receiving laser light from the emitter 105 and for transmitting the light to the optical fiber 301.

As shown in FIGS. 3, 4 and 6, the insert member 200 includes bores 201 and 203. The bore 203 receives an end portion of the optic ferrule 303, and the bore 201 receives an end portion of the laser light emitter 105. The two bores are separated from one another by a thin membrane 205 having a centered aperture 207.

When the insert member 200 is mounted in the counterbore 109 of the housing 100, the bore 201 receives an end portion of the emitter 105 as the emitter 105 is press fit into the bore 111 of the housing 100. In addition, the other bore 203 of the insert member 200 is aligned with the bore 113 of the front barrel portion 101 to receive an end portion of the optic ferrule 303. When the optic ferrule 303 is inserted into the front barrel portion 101, the insert member 200 accurately positions and aligns the ferrule 303 relative to the emitter 105 as disclosed below.

In practice, the membrane 205 is accurately machined (typically, to a thickness between 0.003" to 0.005"). Once the front barrel portion 101 of the housing 100 is sized such that locking engagement of the spring loaded sleeve member 305 with the pin 109 will urge the optic ferrule 303 into touching contact with the membrane 205. Thus, when the membrane 205 is free to move longitudinally, the ferrule end will urge the membrane into touching contact with the laser diode enclosure. The distance separating the ferrule and the end of the laser enclosure, therefore, will be the thickness of the membrane (because the membrane is interposed to separate the end of the ferrule from the laser). Accordingly, it can be appreciated that, because the laser is a press fit, movement of the membrane compensates for 1) variations in the longitudinal dimension of the laser enclosure, and 2) the fact that it is difficult to stop the press fit process when the laser enclosure hits the membrane, without risking crushing the enclosure. Consequently, the optic ferrule 303 is consistently positioned an accurate distance from the laser emitter 105.

Because the connecting operation can be made while a laser system is active, the above-described connector can be termed an Active Device Mount (ADM). The ADM reduces the variances that would otherwise require compensation by electronic trim pots or trim caps and, therefore, eliminates the need for such compensating electronics while increasing the effective dynamic range of the connection. Furthermore, by using the above-identified membrane, the two bores 201 and 203 can be formed in a single operation (and by the same tool). Such a manufacturing technique decreases the cost of post-cast machining operations as compared to operations wherein two separate tools must be separately aligned at opposite ends of a part.

As mentioned above, the membrane 205 includes an aperture 207. In practice, the aperture 207 size is approximately 0.015 inches. This substantially reduces the laser launch power transmitted toward an observer looking at the laser window when the ferrule 303 is not inserted, thus providing a power level through the membrane that is less likely to harm a human eye. At the same time, the light captured by the core of the fiber in the ferrule is unaffected.

It can now be appreciated that the above-described insertable member has numerous advantages. For example, because the insert member is primarily responsible for the accurate alignment and the safety features of the connector, the housing 100 need not be a machined part, but can be fabricated as a low tolerance casting. Consequently, manufacturing costs of the connector are reduced.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations can be made in those embodiments by workers skilled in the art without departing from the scope of present invention as defined by the following claims.

What is claimed is:

1. An optical fiber connector assembly comprising:
a housing having a front and rear barrel portions;
laser means disposed in the rear barrel portion of the housing for directing laser light in a direction toward the front barrel portion;
optical fiber ferrule means for receiving laser light from the laser means, the ferrule means being insertable into the front barrel portion of the housing; and
longitudinally movable insert member means for positioning the ferrule means in proper proximity to the laser means substantially independent of the longitudinal dimension of the laser means, the insert member being movably mounted in the rear barrel portion forward of the laser means toward the front barrel portion.

2. An optical fiber connector assembly according to claim 1, wherein the insert member means includes aperture means for restricting light of the emitter means from propagating into the front barrel portion of the housing.

3. An optical fiber connector assembly according to claim 1, wherein the barrel portion includes a first counterbore for receiving the laser means, the first counterbore having a diameter smaller than an outer diameter of the laser means such that the laser means is secured in the first counterbore by a press fit.

4. An optical fiber connector assembly according to claim 3, wherein the rear barrel portion further includes a second counterbore for receiving the longitudinally movable insert member means, the second counterbore having a smaller diameter than the first counterbore and being located adjacent the first counterbore toward the front barrel portion.

5. An optical fiber connector assembly according to claim 2, wherein the longitudinally movable insert member means includes two opposing counterbores separated by the aperture means, the aperture means being a membrane with a hole positioned concentric with the opposing counterbore, the first of the counterbores being sized to receive the ferrule means, the second of the counterbores being sized to receive at least a portion of the laser means.

6. An optical fiber connector assembly according to claim 5, wherein the membrane is positioned along a longitudinal axis of the longitudinally movable insert member means such that the ferrule means is positioned at the proper proximity to the laser means when the ferrule means is in contact with the membrane.

7. An optical fiber connector assembly according to claim 5, wherein the hole in the membrane is sized to obstruct a significant portion of the divergent light that originates from the laser means which would not normally be captures by the core of the fiber.

8. An optical fiber connector assembly according to claim 1, further comprising means for maintaining the ferrule means in loaded engagement with the insert member means.

9. An optical fiber connector assembly according to claim 1, wherein the housing includes integral means for securing the housing to a printed circuit board.

10. An optical fiber connector housing assembly comprising:
   front and rear barrel portions;
   laser means disposed in the rear barrel portion for directing laser light in a direction toward the front barrel portion;
   longitudinally movable insert member means for maintaining a means for receiving the laser light in proper proximity to the laser means substantially independent of the longitudinal dimension of the laser light source, the insert member being movably disposed in the rear barrel portion forward of the laser means toward the front barrel portion.

11. A method for connecting an optical fiber to a laser light source comprising the steps of:
   inserting a ferrule of an optical fiber into a housing having disposed therein the laser light source;
   securing the ferrule in the housing such that the ferrule is in constant contact with a movable housing membrane such that the ferrule is maintained at a substantially constant distance from the laser light source substantially independent of the longitudinal dimension of the laser light source.

12. A method in accordance with claim 11, wherein the laser light source is secured in the housing by a press fit.

13. A method in accordance with claim 11, wherein the ferrule is maintained at a known fixed distance from the laser light source.

14. A method in accordance with claim 11, wherein the ferrule and the laser light source are maintained in substantial alignment with each other by an insert member movably disposed within the housing, the housing membrane being disposed on the insert member.

* * * * *